(12) United States Patent
Hihara

(10) Patent No.: US 8,899,663 B2
(45) Date of Patent: Dec. 2, 2014

(54) VEHICLE BODY STRUCTURE

(75) Inventor: Yasuyuki Hihara, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 13/825,033

(22) PCT Filed: Apr. 18, 2011

(86) PCT No.: PCT/JP2011/059550
§ 371 (c)(1),
(2), (4) Date: Mar. 19, 2013

(87) PCT Pub. No.: WO2012/144001
PCT Pub. Date: Oct. 26, 2012

(65) Prior Publication Data
US 2014/0028053 A1  Jan. 30, 2014

(51) Int. Cl.
*B62D 25/20* (2006.01)
*B62D 25/02* (2006.01)
*B62D 21/15* (2006.01)

(52) U.S. Cl.
CPC .......... *B62D 25/025* (2013.01); *B62D 25/2036* (2013.01); *B62D 25/20* (2013.01); *B62D 21/157* (2013.01)
USPC .................................................. 296/187.12

(58) Field of Classification Search
CPC ....... B60J 5/0427; B60J 5/0444; B60R 13/04; B60R 19/00; B60R 2013/046; B60R 21/013; B60R 21/0132; B60R 21/0136; B62D 21/04; B62D 21/15; B62D 21/152; B62D 21/155; B62D 21/157; B62D 25/02; B60K 1/04; B60K 2001/0438; B60K 15/067; B60K 15/07; B60K 2015/0634
USPC ......... 296/187.12, 146.7, 155, 68.1, 187.311, 296/193.07, 146.6, 187.03, 187.08, 203.03; 280/784; 340/436
See application file for complete search history.

(56) References Cited

U.S. PATENT DOCUMENTS

| 4,438,969 A | * | 3/1984 | Kamijo et al. | 296/146.9 |
| 5,354,115 A | * | 10/1994 | Esaki | 296/203.03 |
| 5,641,194 A | * | 6/1997 | Honma et al. | 296/203.03 |
| 7,540,343 B2 | * | 6/2009 | Nakashima et al. | 180/65.1 |

(Continued)

FOREIGN PATENT DOCUMENTS

| JP | 62-1019 | 1/1987 |
| JP | 2002-249079 | 9/2002 |

(Continued)

OTHER PUBLICATIONS

Toyota Motor Corp., "Energy Absorption Structure of Vehicle Side Door," Japan Institute of Invention and Innovation, Journal of Technical Disclosure, Journal No. 2007-505961, Dec. 3, 2007, (2 pages).

(Continued)

*Primary Examiner* — Glenn Dayoan
*Assistant Examiner* — Sunsurraye Westbrook
(74) *Attorney, Agent, or Firm* — Finnegan, Henderson, Farabow, Garrett & Dunner, LLP

(57) ABSTRACT

A vehicle body structure is obtained that can ensure ease of ingress/egress in a structure in which an energy absorbing member is disposed at a vehicle width direction outer side with respect to a skeleton member that forms a lower edge of an opening for ingress/egress. A vehicle body structure (10) has a rocker (20) that is long in a front-rear direction and at which a cross-section orthogonal to the longitudinal direction is a closed cross-sectional portion (20C); an outer panel (55) that covers the rocker (20) from a transverse direction outer side; and an EA member (54) for a side collision that is disposed between the rocker (20) and the outer panel (55). An opening flange (80) is formed by joining of a standing flange (60), that is disposed at a vehicle width direction outer side with respect to the closed cross-sectional portion (20C) at the rocker (20), and a standing flange (62) of the outer panel (55).

7 Claims, 8 Drawing Sheets

(56) References Cited

U.S. PATENT DOCUMENTS

| | | |
|---|---|---|
| 2003/0141712 A1 | 7/2003 | Miyasaka |
| 2009/0033476 A1 | 2/2009 | Iwano et al. |
| 2010/0231002 A1* | 9/2010 | Yoshioka et al. ........ 296/187.12 |

FOREIGN PATENT DOCUMENTS

| | | |
|---|---|---|
| JP | 2007-30721 | 2/2007 |
| JP | 2008-100548 | 5/2008 |
| JP | 2008-155700 | 7/2008 |

OTHER PUBLICATIONS

Notice of Reasons for Rejection for Japanese Appl. No. 2012-520397 dated May 7, 2013.

* cited by examiner

VEHICLE BODY STRUCTURE

CROSS-REFERENCE TO RELATED APPLICATIONS

This application is a national phase application of International Application No. PCT/JP2011/059550, filed Apr. 18, 2011, the content of which is incorporated herein by reference.

TECHNICAL FIELD

The present invention relates to a vehicle body structure.

BACKGROUND ART

There is known a configuration in which an energy absorbing member, that is wave-shaped and absorbs impact energy of a side collision, is disposed within the closed cross-section of a rocker that forms the skeleton of a vehicle body that is formed from a fiber-reinforced plastics material (see, for example, Japanese Patent Application Laid-Open No. 2008-400548).

DISCLOSURE OF INVENTION

Technical Problem

In a configuration in which an energy absorbing member is disposed within a closed cross-section, crushing of the closed cross-section of the skeleton member is needed in order to create the energy absorption stroke.

An object of the present invention is to obtain a vehicle body structure that can ensure the ease of ingress/egress at a configuration in which an energy absorbing member is disposed at the vehicle width direction outer side with respect to a skeleton member that forms the lower edge of an opening for ingress/egress.

Solution to Problem

A vehicle body structure relating to a first aspect of the present invention comprises: a skeleton member that is long in a vehicle front-rear direction and has a closed cross-sectional portion wherein a cross-section orthogonal to the longitudinal direction is a closed cross-section, due to joining of an upper panel and a lower panel, and having a first flange that is disposed so as to prescribe a lower edge of an opening for ingress/egress at a vehicle width direction outer end side of a vehicle body and that is provided at a vehicle width direction outer end of the closed cross-sectional portion or at a vehicle width direction outer side with respect to the closed cross-sectional portion so as to face the vehicle width direction outer side; an outer panel having a second flange that is joined to the first flange and that configures an opening flange that projects out into the opening for ingress/egress, and covering the skeleton member from the vehicle width direction outer side; and an energy absorbing member disposed between the outer panel and an outer side wall that configures a vehicle width direction outer side at the closed cross-sectional portion of the skeleton member.

In accordance with the above-described aspect, because the energy absorbing member is disposed at the vehicle width direction outer side with respect to the closed cross-section of the skeleton member, an energy absorption stroke by the energy absorbing member is ensured without crushing the skeleton member. Further, because the load after the energy (dynamic load) absorption by the energy absorbing member is transmitted to the skeleton member, deformation of the vehicle body due to a side collision is suppressed. Here, in the present vehicle body structure, the first flange and the second flange of the outer panel are joined and the opening flange is configured, at a position that substantially coincides with the vehicle width direction outer end of the closed cross-sectional portion of the skeleton member, or further toward the vehicle width direction outer side than the closed cross-sectional portion. Therefore, the distance, along the vehicle width direction, from the outer end of the outer panel to the opening flange can be kept short as compared with a configuration in which, for example, the opening flange is disposed at the vehicle width direction central portion of the skeleton member (the closed cross-sectional portion). Due thereto, in the present vehicle body structure, the ease of ingress/egress of the vehicle occupant from the opening for ingress/egress is good.

In this way, the ease of ingress/egress can be ensured in a configuration in which an energy absorbing member is disposed at the vehicle width direction outer side with respect to a skeleton member that forms the lower edge of an opening for ingress/egress.

In the above aspect, a configuration may be provided, wherein the energy absorbing member is fixed to the outer side wall that configures the closed cross-sectional portion of the skeleton member; and a plurality of ribs are formed at the outer side wall at intervals in the vehicle front-rear direction.

In accordance with the above-described aspect, the outer side wall, that forms the closed cross-section of the skeleton member, is reinforced by the ribs. Therefore, the reaction force at the time when the energy absorbing member absorbs the energy of a side collision is soundly supported, and deformation of the vehicle body side is also suppressed.

In the above aspect, a configuration may be provided, wherein the upper panel and the lower panel are joined at a vertically-overlapped joined portion that is disposed between the closed cross-sectional portion and the first flange in a vehicle width direction; and the ribs project out toward the vehicle width direction outer side from the outer side wall configured by the lower panel, and positions in the vehicle width direction of projecting-out ends of the ribs are positioned within a range of a thickness of the opening flange in the vehicle width direction.

In accordance with the above-described aspect, the upper panel and the lower panel are joined in a vertically-overlapped manner between the first flange (the opening flange) and the closed cross-section at the skeleton member, i.e., at the vehicle width direction outer side with respect to the closed cross-sectional portion. The ribs, at which the positions of the vehicle width direction outer ends are within the range of the thickness of the opening flange, are provided at the lower side of this joined portion and at the vehicle width direction outer side of the outer side wall. Therefore, when, for example, a collision body reaches as far as the opening flange, the load from that collision body can be received by the opening flange and the plural ribs. Due thereto, deformation of the vehicle body side can be suppressed effectively.

In the above aspect, a configuration may be provided, wherein the ribs are formed integrally respectively with the outer side wall and a portion, at the lower panel side, of the vertically-overlapped joined portion.

In accordance with the above-described structure, because the ribs are formed integrally with both that side wall of the skeleton member and the vertically-overlapped joined, portion, the deformation suppressing effect (reinforcing effect) of the vehicle body side by the ribs is good.

In the above aspect, a configuration may be provided, wherein the upper panel and the lower panel are joined at a vertically-overlapped joined portion that is disposed at an inner side in the vehicle width direction with respect to the closed cross-sectional portion; and at least one of the upper panel or the lower panel extends in the vehicle width direction and configures at least a portion of a vehicle floor.

In accordance with the above-described aspect, the upper panel and the lower panel are vertically overlapped and joined at the vehicle width direction both sides with respect to the closed cross-section, and are formed integrally with at least a portion of the vehicle floor. Therefore, the productivity of the vehicle body side, that includes the skeleton member and the vehicle floor, is good.

In the above aspect, a configuration may be provided, wherein a position, in a vehicle width direction, of the outer side wall coincides with the first flange; and the ribs project out toward an inner side in the vehicle width direction with respect to the outer side wall.

In accordance with the above-described aspect, the first flange extends upwardly (substantially flush) from the outer side wall upper end of the closed cross-section at the skeleton member, and the plural ribs are disposed at the vehicle width direction inner side of the outer side wall, i.e., within the closed cross-section. Therefore, when, for example, a collision body reaches as far as the opening flange, the load from that collision body can be received by the opening flange and the plural ribs. Due thereto, deformation of the vehicle body side can be suppressed effectively.

In the above aspect, a configuration may be provided so as to further include: another rib that projects out toward a vehicle width direction exterior from the outer side wall at a front side or a rear side, in the vehicle front-rear direction, with respect to the plurality of ribs, and whose dimension in the vehicle width direction is larger than the ribs or at which a position of a vehicle width direction outer end is positioned further toward the vehicle width direction outer side than the ribs; and another energy absorbing member that is disposed between the other rib and a wheel in the vehicle front-rear direction, and that absorbs impact energy in the vehicle front-rear direction.

In accordance with the above-described aspect, there is provided at least one of an energy absorbing member for a front collision, that is disposed between a front wheel and the other rib that is positioned at the front side of the plural ribs, and an energy absorbing member for a rear collision, that is disposed between a rear wheel and the other rib that is positioned at the rear side of the plural ribs. Due thereto, at the time of a front collision or at the time of a rear collision, the load from the wheel can be transmitted effectively via the other energy absorbing member to the skeleton member, while the impact energy is absorbed.

In the above aspect, a configuration may be provided in which, as seen from the longitudinal direction of the skeleton member, an end portion of the outer panel at a side opposite to the second flange is provided as a free end.

In accordance with the above-described aspect, the outer panel is joined to the first flange of the skeleton member side, at the second flange that is positioned at the one end side as seen in the front-rear direction. On the other hand, the other end side is made to be a free end that is not joined to the skeleton member. Therefore, in the present vehicle body structure, there are few joined regions of the skeleton member and the outer panel, and the productivity is good.

Advantageous Effects of Invention

As described above, the vehicle body structure relating to the present invention has the excellent effect that the ease of ingress/egress can be ensured in a configuration in which an energy absorbing member is disposed at the vehicle width direction outer side with respect to a skeleton member that forms the lower edge of an opening for ingress/egress.

BEST MODES FOR CARRYING OUT THE INVENTION

Figure 1:
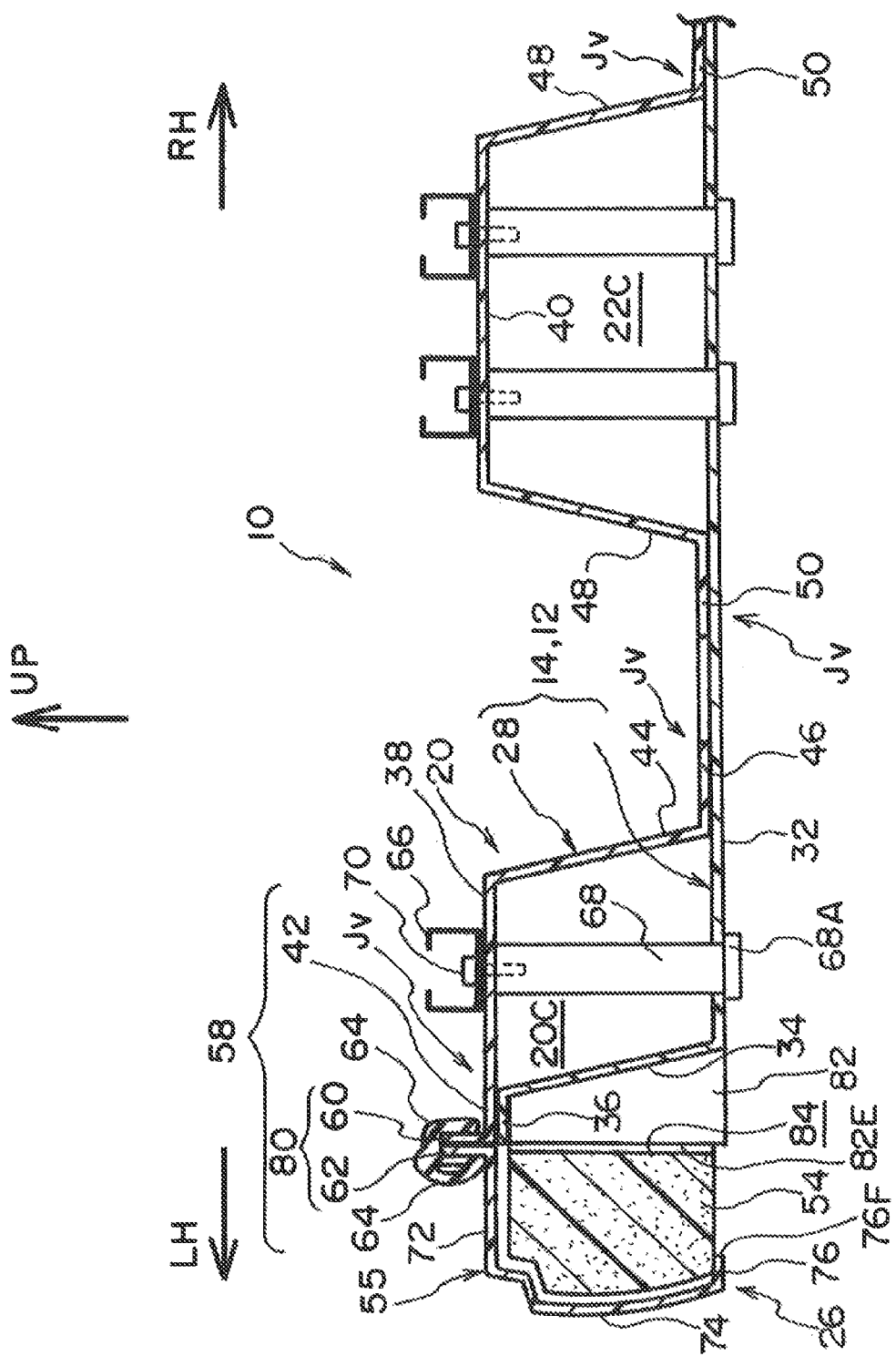
FIG. 1 is a drawing showing a vehicle body structure relating to a first embodiment of the present invention, and is a cross-sectional view along line 1-1 of FIG. 2.

A vehicle body structure 10 relating to a first embodiment of the present invention is described on the basis of FIG. 1 through FIG. 6. Note that arrow FR shown appropriately in the drawings indicates the frontward direction in the vehicle front-rear direction, arrow UP indicates the upward direction in the vehicle up-down direction, arrow RH indicates the vehicle right side that is one side in the vehicle width direction, and arrow LH indicates the vehicle left side that is the other side in the vehicle width direction. When the frontward and rearward, upward and downward, and left and right directions are used in the following description, they indicate frontward and rearward in the vehicle front-rear direction, upward and downward in the vehicle up-down direction, and left and right when facing in the forward direction, unless otherwise indicated. Further, the structure of the vehicle body structure 10 is basically symmetrical at the left and the right, and therefore, for portions that are symmetrical at the left and the right, mainly one of the left and right sides is described.

(Overall Structure)

Figure 2:
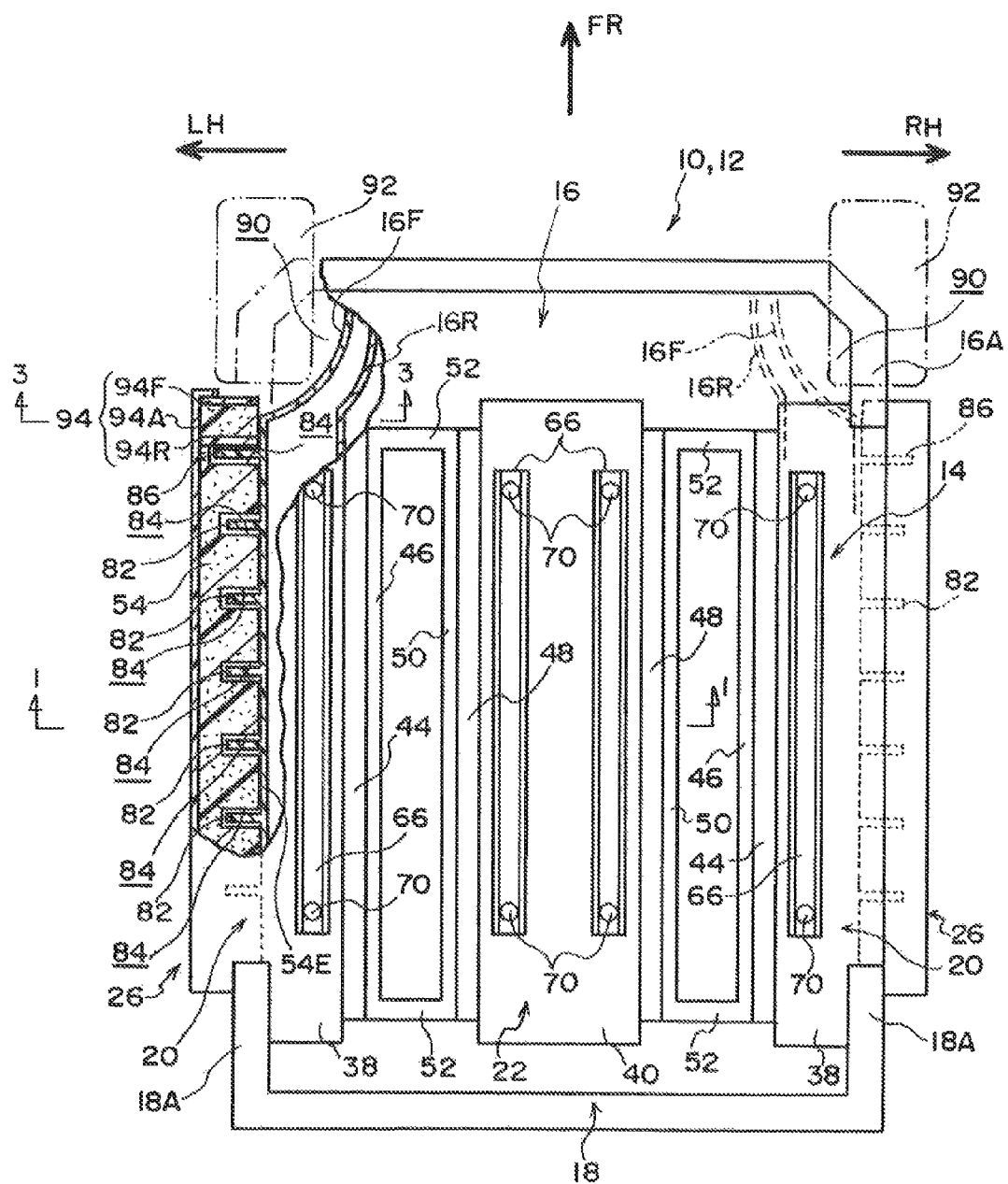
FIG. 2 is a plan view, a portion of which is cut-out, that shows the vehicle body structure relating to the first embodiment of the present invention.

In FIG. 2, an underbody 12, that configures an automobile V to which the vehicle body structure 10 is applied, is shown in a schematic plan view of a cut-out portion thereof. As shown in this drawing, the underbody 12 has a floor 14, a dash lower portion 16 that is provided to stand from the front end of the floor 14, and a lower back portion 18 that is provided to stand from the rear end of the floor 14. Further, a front side wall 16A, that wraps-in toward the vehicle rear side, is provided continuously with the vehicle width direction both ends of the dash lower portion 16, and a rear side wall 18A, that wraps-in toward the vehicle front side, extends at the vehicle width direction both ends of the lower back portion 18. The underbody 12 is thereby formed overall in the shape of a bathtub (the shape of a bathtub in which portions of the side walls are cut-out). The front side wall 16A is a configuration that is connected to front pillars 88 that are described later. Further, the rear portions of wheel houses 90 that accommodate front wheels 92 are formed at the vehicle width direction both sides of the dash lower portion 16.

The floor 14 is formed in a substantial flat plate shape overall, and has a pair of left and right rockers 20 and a center skeleton portion 22 that are respectively long in the front-rear direction and that serve as a skeleton structure. The rockers 20 are skeleton members that reach from the dash lower portion 16 to the lower back portion 18 at the vehicle width direction outer ends of the floor 14. The center skeleton portion 22 is a skeleton member that reaches from the dash lower portion 16 to the lower back portion 18 at the vehicle width direction central portion of the floor 14. As shown in FIG. 1, the rockers 20 and the center skeleton portion 22 are closed cross-sectional structures in a sectional view that is orthogonal to the longitudinal direction. Further, as shown in FIG. 1 and FIG. 2, energy absorbing portions 26 that are described in detail later are provided at the vehicle width direction outer sides of the rockers 20.

The floor 14 in this embodiment is configured by the joining of a vertically-overlapped structure of two members that are an upper panel 28 and a lower panel 30. Concretely, as shown in FIG. 1, the lower panel 30 is configured to include a bottom wail 32 that is substantially flat along a horizontal plane, and outer side walls 34 that are provided to stand from the side peripheral edges of the bottom wall. Dash front wall 16F, that configures the front wall of the dash lower portion 16 (the wheel houses 90) is provided to stand from the front edge of the bottom wall 32, and an unillustrated lower back rear wall, that configures the rear wall of the lower back portion 18, is provided to stand from the rear edge of the bottom wall 32. Outer flanges 36 project out toward the vehicle width direction exterior along a substantially horizontal plane, from the top ends of the outer side walls 34 at the lower panel 30.

The upper panel 28 has a pair of left and right rocker top walls 38 and a center top wall 40 that face the bottom wall 32. The rocker top walls 38 and the center top wall 40 are formed to be flat along a substantially horizontal plane. Accordingly, the rocker upper walls 38 and the center upper wall 40 are disposed parallel to the bottom wall 32 (the facing surfaces thereof are parallel).

Outer flanges 42, which are joined to the outer flange 36, project out, along a substantially horizontal plane, from the vehicle width direction outer ends of the rocker top walls 38. Further, rocker inner walls 44 that face the outer side walls 34 hang down from the vehicle width direction inner ends of the rocker top walls 38. Inner flanges 46 that are joined to the bottom wall 32 project out toward the vehicle width direction interior, from the lower ends of the rocker inner walls 44. In this embodiment, the outer flanges 36, 42 configure a vertically-overlapped joined portion Jv at the vehicle width direction outer side with respect to a closed cross-sectional portion 20C of the rocker 20. Further, the bottom wall 32 and the inner flange 46 configure the vertically-overlapped joined portion JAY at the vehicle width direction inner end with respect to the closed cross-sectional portion 20C of the rocker 20.

Moreover, center side walls 48 that face one another hang-down from the vehicle width direction both ends of the center top wall 40. Center flanges 50, that project out so as to move away from one another in the vehicle width direction and that are joined to the bottom wall 32, are provided continuously with the respective lower ends of the left and right center side walls 48. As shown in FIG. 2, the front and rear end portions of the inner flanges 46 and the center flanges 50 are connected to one another by connecting flanges 52. Dash rear wall 16R that configures the dash lower portion 16 (the wheel houses 90) is provided so as to stand at the front end of the upper panel 28 so as to face the dash front wall 16F of the lower panel 30 side. Further, although not illustrated, a lower back front wall that configures the lower back portion 18 is provided to stand at the rear end of the upper panel 28 so as to face the lower back rear wall of the lower panel 30.

Moreover, when the upper panel 28 and the lower panel 30 are overlapped vertically and assembled, and the outer flanges 36 and the outer flanges 42 are joined, and the inner flanges 46, the center flanges 50 and the connecting flanges 52 are joined to the bottom wall 32, the floor 14 (the underbody 12) is configured. Due thereto, the left and right rockers 20 have the closed cross-sectional portions 20C that are surrounded by the bottom wall 32, the outer side walls 34, the rocker top walls 38, and the rocker inner walls 44, and that form substantially quadrangular (parallelogram) frame shapes. Further, the center skeleton portion 22 has a closed cross-sectional portion 22C that is substantially quadrangular (trapezoidal) frame shaped and is surrounded by the center top wall 40, the left and right center side walls 48, and the bottom wall 32.

In this embodiment, due to the joining of the upper panel 28 and the lower panel 30, the main portions of the underbody 12, including the floor 14, the dash lower portion 16 and the lower back portion 18, are configured. Further, in this embodiment, the upper panel 28 and the lower panel 30 are respectively configured by CFRP that serves as a fiber-reinforced plastic, and the respective joined regions are joined by adhesion, fusion, or welding or the like.

(Seat Rail Fixing Structure)

As shown in FIG. 1 and FIG. 2, seat rails 66, for supporting an unillustrated vehicle seat on which a vehicle occupant sits such that the vehicle seat is slidable in the front-rear direction, are fixed at the above-described underbody 12. In this embodiment, the seat rails 66 at the vehicle width direction outer sides are fixed to the rocker top walls 38 of the rockers 20. On the other hand, the seat rails 66 at the vehicle width direction inner side are fixed to the center top wall 40 of the center skeleton portion 22. Concrete description is given hereinafter.

Collar nuts 68 serving as collar members are respectively disposed within the closed cross-sections of the respective rockers 20. Each of the collar nuts 68 has a flange 68A at the lower end portion thereof, and is adhered to the bottom surface of the bottom wall 32 at the flange 68A in a state of being passed-through the bottom wall 32. The upper end of each of the collar nuts 68 is a stepped structure, and the collar nut 68 is adhered to the bottom surface of the rocker top wall 38 at the large-diameter portion, and the small-diameter portion is exposed from the rocker top wall 38.

The respective seat rails 66 are fastened and fixed to the rocker top walls 38 due to bolts 70, that serve as fastening fixtures, being screwed-together with the collar nuts 68. In this state, the rocker top walls 38 are nipped between the large-diameter portions of the collar nut 68 upper ends and the seat rails 66. Due to the small-diameter portions of the respective collar nuts 68 functioning as spacers, excessive compressive load being applied to the rocker top walls 38 is suppressed.

The respective collar nuts 68 for the left and right seats are disposed within the closed cross-section of the center skeleton portion 22. Each of the collar nuts 68 is adhered to the bottom surface of the bottom wall 32 at the flange 68A in a state of being passed-through the bottom wall 32. At the upper end of each of the collar nuts 68, the collar nut 68 is adhered to the bottom surface of the center top wall 40 at the large-diameter portion, and the small-diameter portion is exposed from the center top wall 40. The respective seat rails 66 are fastened and fixed to the center top wall 40 due to the bolts 70 being screwed-together with the collar nuts 68. In this state, the center top wall 40 is nipped between the large-diameter portions of the collar nut 68 upper ends and the seat rails 66. Due to the small-diameter portions of the respective collar nuts 68 functioning as spacers, excessive compressive load being applied to the center top wall 40 is suppressed.

As shown in FIG. 2, the respective seat rails 66 that are long in the front-rear direction are fixed, at the front end sides and rear end sides, to the skeleton portions the rocker top walls 38, the center top wall 40) of the underbody 12 by the screwing-together of the bolts 70 with the collar nuts 68. Further, within the closed cross-sections of the rockers 20, block members, that support these cross-sections from the inner sides, may be disposed so as to surround the collar nuts 68. These block members may be configured by a fiber-reinforced plastic.

(Energy Absorbing Structure)

Further, as described above, the energy absorbing portions 26 are provided at the vehicle width direction outer sides of the left and right rockers 20 as shown in FIG. 1. The energy absorbing portion 26 is configured by an EA member 54 for a side collision, that serves as an energy absorbing member, being covered by an outer panel (side member outer) 55 that is an exterior material. Concrete description is given hereinafter.

A standing flange 60 serving as a first flange is provided to stand from the vehicle width direction outer end of the outer flange 42 at the upper panel 28 that configures the underbody 12. On the other hand, a standing flange 62 serving as a second flange is provided to stand from the vehicle width direction inner end of the outer panel 55. The outer panel 55 is fixed to the rocker 20 the underbody 12) by being joined to the standing flange 60 at the standing flange 62.

The outer panel 55 has a top wall 72 that extends from the lower end of the standing flange 62 toward the vehicle width direction exterior (substantially horizontally), an outer wall 74 that hangs down from the vehicle width direction outer end portion of the top wall 72, and a lower wall 76 that extends from the lower end of the outer wall 74 toward the vehicle width direction interior. The vehicle width direction inner end of the lower wall 76 is a free end 76F that is not joined to the rocker 20 (the outer side wall 34 and reinforcing ribs 82 that are described later).

Here, the rocker 20 and the impact absorbing portion 26 form a rocker step portion 58 that forms the lower edge of a door opening 78 (see FIG. 4) that is an opening for ingress/egress of a vehicle occupant. Further, the standing flange 60 and the standing flange 62 that are joined together configure an opening flange 80 that projects-out from the rocker 20 toward the door opening 78. This opening flange 80, i.e., the joined portion of the standing flange 60 and the standing flange 62, is covered by an opening trim 64.

The EA member 54 for a side collision is disposed between the outer wall 74 of the outer panel 55 and the outer side wall 34 of the rocker 20 in the vehicle width direction, and is disposed between the top wall 72 and the lower wall 76 in the up-down direction. The EA member 54 for a side collision is configured from, for example, foamed urethane foam or the like, and is configured so as to, while being compressed due to the load of a side collision, absorb a portion of the energy of that collision. As shown in FIG. 2, the EA member 54 for a side collision is fixed, at an inner end surface 54E thereof in the vehicle width direction, to the outer side wall 34 by adhesion or the like.

Further, the vehicle body structure 10 has the plural reinforcing ribs 82 that serve as plural ribs and that project out toward the vehicle width direction exterior from the outer side wall 34. The plural ribs 82 are disposed with an interval therebetween in the front-rear direction. In this embodiment, the top ends of the respective reinforcing ribs 82 are connected to the outer flange 36. Namely, the respective reinforcing ribs 82 are configured, by CFRP, integrally with the outer side wall 34 and the outer flange 36 that configure the lower panel 30. Further, as shown in FIG. 1, the positions, in the vehicle width direction, of vehicle width direction outer end surfaces 82E of the respective reinforcing ribs 82 coincide with the standing flange 60. Namely, in the vehicle width direction, the end surfaces 82E of the respective reinforcing ribs 82 are positioned within the range of the thickness of the opening flange 80 (the portion at which the standing flange 60 and the standing flange 62 are overlapped). In other words, the respective end surfaces 82E of the respective reinforcing ribs 82 are configured that overlap with the opening flange 80 as seen in bottom view. Therefore, the respective reinforcing ribs 82 form substantially rectangular shapes as seen in the front-rear direction.

On the other hand, as shown in FIG. 2, plural slits 84, into which the respective reinforcing ribs 82 and a rib 86 for a front collision that is described later are individually inserted, are formed in the EA member 54 for a side collision with intervals therebetween in the front-rear direction. The pitch of the respective reinforcing ribs 82 that is described later, i.e., the pitch (to be described later) of the slits 84, is determined in consideration of the foot width (approximately 100 mm) of the vehicle occupant, and the energy absorption performance by the EA member 54 for a side collision, and the reinforcing effect of the outer side wall 34 by the respective reinforcing ribs 82 (including the effect of suppressing penetration of a collision body), and the like.

Further, as shown in FIG. 2, the vehicle body structure 10 has the rib 86 for a front collision that is disposed at the front side with respect to the plural reinforcing ribs 82, and is made to be larger in the vehicle width direction (made to project out more toward the vehicle width direction outer side) than the reinforcing ribs 82, and serves as another rib. In this embodiment, the rib 86 for a front collision is made to be thicker than the reinforcing ribs 82.

Figure 3:
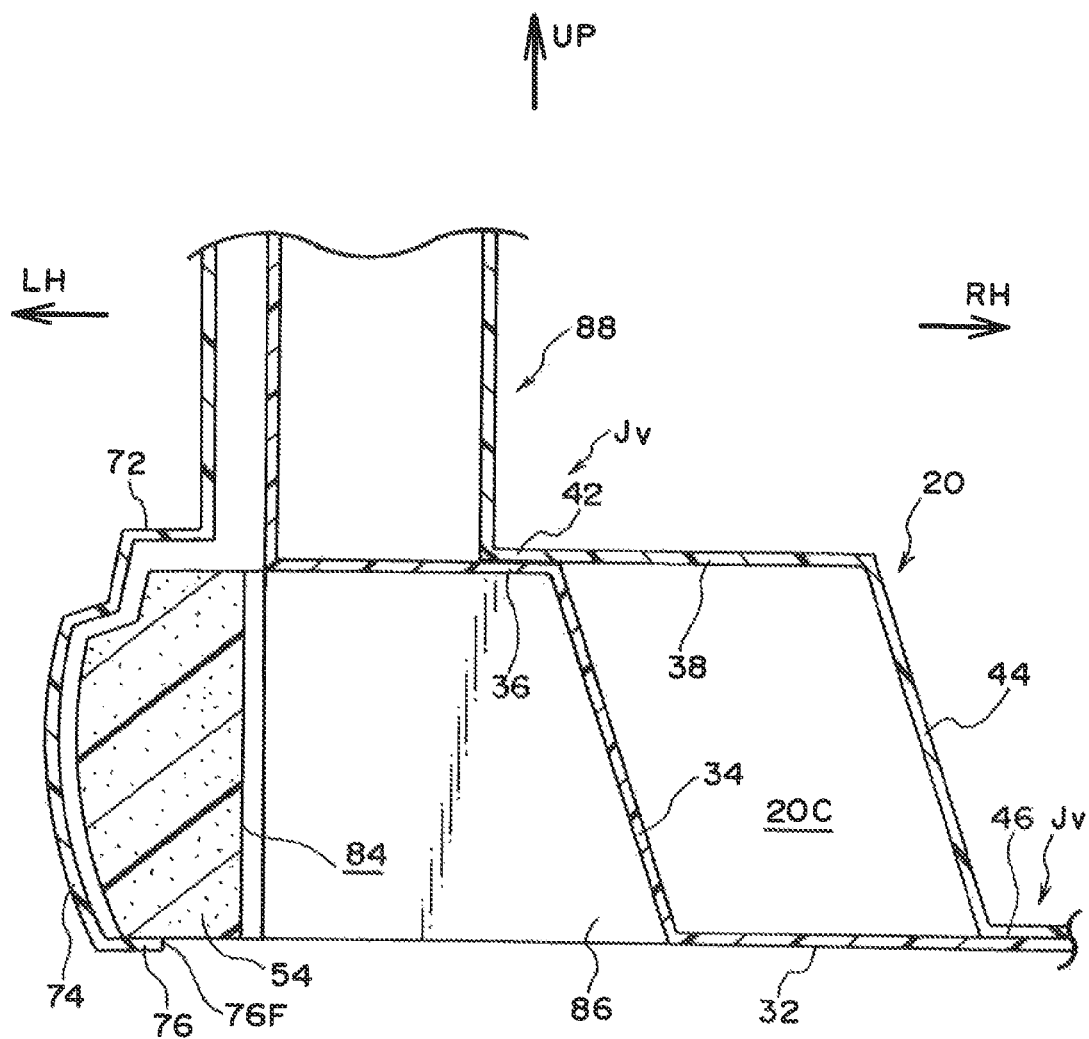
FIG. 3 is a drawing showing the vehicle body structure relating to the first embodiment of the present invention, and is a cross-sectional view along line 3-3 of FIG. 2.
Figure 4:
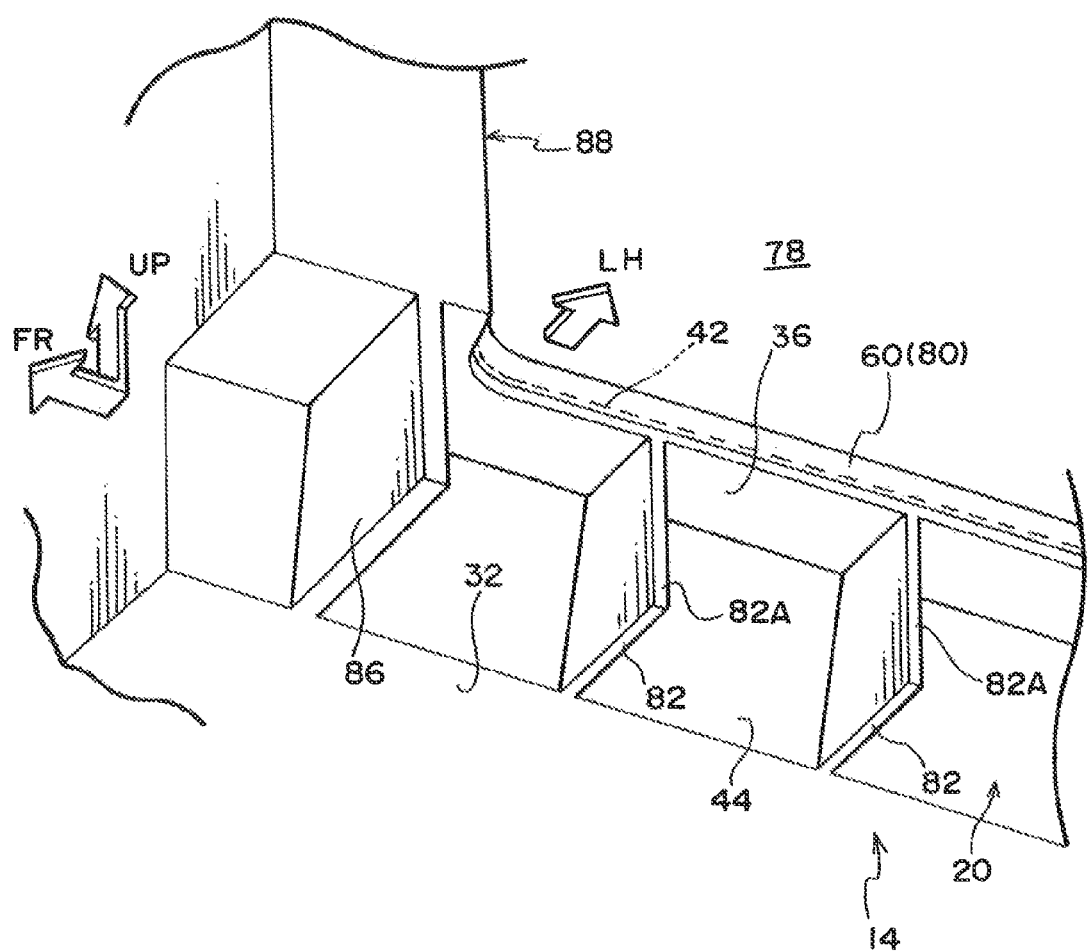
FIG. 4 is a perspective view showing a rib for a front collision that configures the vehicle body structure relating to the first embodiment of the present invention.

As shown in FIG. 3 and FIG. 4, the rib 86 for a front collision is disposed in a vicinity of the joined region of the rocker 20 and the front pillar 88 in the front-rear direction. The front pillar 88 is a skeleton member whose lower end is connected to the front end portion of the rocker 20 and that prescribes the front edge of the door opening 78. The (rear portion of the) wheel house 90 is disposed at the front of the front pillar 88 at the underbody 12. The front wheel 92 that serves as a wheel is disposed within the wheel house 90.

Further, as shown in FIG. 2, an EA member 94 for a front collision that serves as another energy absorbing member is disposed between the rib 86 for a front collision and the front wheel 92. The EA member 94 for a front collision is configured so as to, by receiving compression in the front-rear direction and being crushed, absorb the impact energy at a time when the front wheel 92 collides with the rear edge of the wheel house 90 at the underbody 12 at the time of a front collision. This EA member 94 for a front collision is configured by an EA portion 94A being sandwiched between a pair of front and rear plates 94F, 94R. Hereinafter, the plate 94F at the front side is called the load input wall 94F, and the plate 94R at the rear side is called the load transmitting wall 94R. The EA portion 94A is configured from, for example, foamed urethane foam or the like.

The EA member 94 for a front collision receives, at the load input wall 94F, load from the front wheel 92, and, while transmitting this load to the rib 86 for a front collision via the load transmitting wall 94R and while this load is supported at the rib 86 for a front collision, absorbs (a portion of) the front collision energy due to the compression of the EA portion 94A. The EA member 94 for a front collision is fixedly held at the rocker 20 in a state in which the load transmitting wall 94R contacts or is adjacent to the rib 86 for a front collision. The load transmitting wall 94R may be fixed to the rib 86 for a front collision by adhesion or the like.

In this embodiment, the pitch between the rib 86 for a front collision and the reinforcing rib 82, and the pitch between the reinforcing ribs 82, are respectively made to be approximately 200 mm. Note that, although not illustrated, a rib for a rear collision that supports an EA member for a rear collision, that is larger in the vehicle width direction than the reinforcing ribs 82 and that serves as another energy absorbing member, may be provided at the rear side with respect to the plural reinforcing ribs 82 in the same way as (so as to have front-rear symmetry with) the above-described rib 86 for a front collision.

Operation of the first embodiment is described next.

In the automobile V to which the vehicle body structure 10 of the above-described configuration is applied, at the time of a side collision, the load of this side collision is inputted to the EA member 54 for a side collision via the outer panel 55. The EA member 54 for a side collision is compressed in the vehicle width direction while the load (reaction force) is supported at the rocker 20, and absorbs collision energy. Due thereto, at the automobile V to which the vehicle body structure 10 is applied, deformation of the vehicle body (the underbody 12) due to the side collision is suppressed.

Here, in the vehicle body structure 10, the EA member 54 for a side collision is disposed at the vehicle width direction outer side (the outer side of the closed cross-section) with respect to the rocker 20. Therefore, without crushing the rocker 20 that is formed from CFRP that is a brittle material, the compression (deformation) stroke of the EA member 54 for a side collision is ensured, and the desired energy absorption is achieved. Due thereto, as described above, deformation of the underbody 12, that includes the floor 14, due to a side collision is suppressed.

Further, in the vehicle body structure 10, the opening flange 80 is formed by the joining of the standing flange 60, that is provided at the vehicle width direction outer side with respect to the closed cross-sectional portion 20C of the rocker 20, and the standing flange 62 of the outer panel 55. Therefore, in a configuration in which the EA member for a side collision is disposed at the outer side of the rocker 20, the distance from the outer wall 74 of the outer panel 55 to the opening flange 80 can be kept small. For example, a general configuration that is a body made of steel is contemplated in which the opening flange is formed by a rocker outer panel and a rocker inner panel being joined at the standing flanges thereof at the vehicle width direction center of the rocker, and a standing flange of an outer panel being joined thereto. In a comparative example in which an EA member is disposed at the vehicle width direction outer side of the rocker (between the rocker and the outer panel) in such a configuration, the distance from the outer wall of the outer panel to the opening flange becomes longer by an amount corresponding to the thickness of the EA member, and the ease of ingress/egress of a vehicle occupant through the door opening 78 is poor.

In contrast, in the vehicle body structure 10, the distance from the outer wall 74 of the outer panel 55 to the opening flange 80 can be kept small as described above, and therefore, contributes to ensuring the ease of ingress/egress of a vehicle occupant through the door opening 78.

In this way, in the vehicle body structure 10 relating to the present embodiment, the ease of ingress/egress can be ensured in a configuration in which the EA member 54 for a side collision is disposed at the vehicle width direction outer side with respect to the rocker 20 that forms the lower edge of the door opening 78.

Further, here, in the vehicle body structure 10, the plural reinforcing ribs 82 are provided to project in the vehicle width direction from the outer side wall 34 of the rocker 20 that supports the EA member 54 for a side collision. Due thereto, the outer side wall 34 is reinforced by the respective reinforcing ribs 82. In particular, because the respective reinforcing ribs 82 are made integral with the outer side wall 34 and the outer flange 36, the effect of reinforcing the outer side wall 34 by the respective reinforcing ribs 82 is great. For these reasons, deformation of the underbody 12, that includes the floor 14, due to a side collision can be effectively suppressed.

Moreover, the end surfaces 82E of the reinforcing ribs 82 and the standing flange 60 (the opening flange 80) are made to be substantially flush. Therefore, when a collision body of a side collision reaches as far as the opening flange 80, the load from this collision body can be received at the plural reinforcing ribs 82 (the reinforcing ribs 82). Due thereto, deformation of the rocker 20, and accordingly, the underbody 12 that includes the floor 14, can be suppressed even more effectively.

Further, in the vehicle body structure 10, the plural reinforcing ribs 82 are provided with an interval therebetween in the front-rear direction, beneath the opening flange 80 and the joined portion Jv (the outer flanges 36, 42) that are disposed at the vehicle width direction outer side of the closed cross-sectional portion 20C of the rocker 20. Due thereto, the rigidity of the rocker step portion 58 is ensured. Namely, in a comparative example that does not have the reinforcing ribs 82, it is easy for the rigidity to be insufficient because the opening flange 80 becomes a cantilevered structure with respect to the closed cross-sectional portion 20C of the rocker 20. In contrast, in the vehicle body structure 10, the rigidity when a vehicle occupant steps on the rocker step portion 58 is ensured by the respective reinforcing ribs 82 that are made integral with the outer flange 36 and the outer side wall 34. This also contributes to an improvement in the ease of ingress/egress of the vehicle occupant.

Still further, in the vehicle body structure 10, the underbody 12 that includes the rockers 20 is configured by the joining of a vertically-overlapped structure of the upper panel 28 and the lower panel 30. Namely, the rocker 20 is formed by being joined by the vertically-overlapped joined portions Jv (the outer flange 42 and the outer flange 36, the bottom wall 32 and the inner flange 46, and the bottom wall 32 and the center flange 50) of the upper panel 28 and the lower panel 30. Therefore, the vehicle body structure 10 has good productivity as compared with a configuration in which the skeleton members are formed by left/right-overlapped structures. In particular, in the vehicle body structure 10, the productivity of the underbody 12 is good because the main portions of the underbody 12, including the floor 14, are formed by the vertically-overlapped joining of the upper panel 28 and the lower panel 30.

Moreover, in the vehicle body structure 10, the end portion, that is at the side opposite the opening flange 80 side, at the lower wall 76 of the outer panel 55 is made to be the free end 76E. Namely, because the rigidity of the rocker step portion 58 is ensured by the respective reinforcing ribs 82 as described above, a structure in which one end of the outer panel 55 is provided as the free end 76F can be adopted. By adopting this structure, the rocker 20 and the outer panel 55 are a configuration that is fixed only at the joined portion of the standing flange 60 and the standing flange 62, and therefore, there are few joined regions, and the productivity of the underbody 12 is even better.

Still further, here, the vehicle body structure 10 has the rib 86 for a front collision that is provided at the rocker 20, and the EA member 94 for a front collision that is disposed directly in front of this rib 86 for a front collision. Therefore, when the automobile V experiences a front collision and the front wheel 92 retreats and hits the rear edge of the wheel house 90, rearward load from the front wheel 92 is applied to the EA member 94 for a front collision. Namely, at the EA member 94 for a front collision, load is inputted from the load input wall 94F, and the EA portion 94A is compressed while the EA member 94 is supported by the rib 86 for a front collision that the load transmitting wall 94R contacts. Due thereto, while absorbing the collision energy (dynamic load) by the compression of the EA portion 94A, the EA member 94 for a front collision can transmit that load to the rocker 20 that is a skeleton member.

Figure 5:
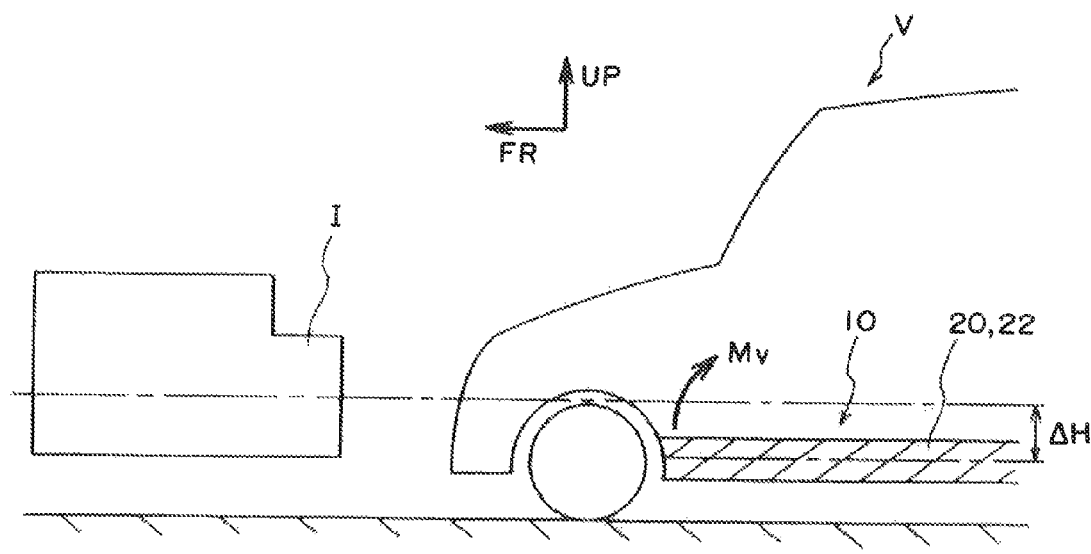
FIG. 5 is a schematic side view showing the state of a front collision of an automobile to which the vehicle body structure relating to the first embodiment of the present invention is applied.
Figure 6:
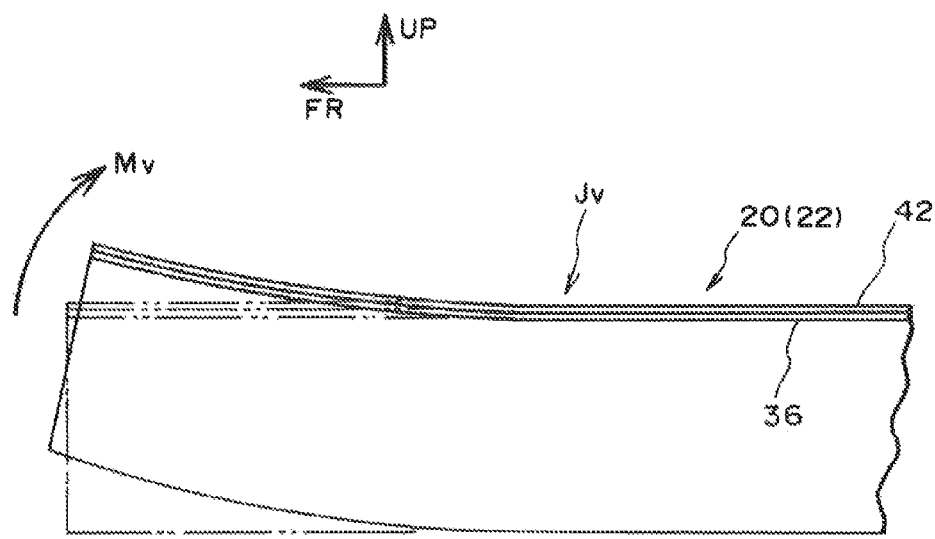
FIG. 6 is a side view schematically showing a state of deforming at the time of a front collision, of a rocker that configures the vehicle body structure relating to the first embodiment of the present invention.

In particular, at the vehicle body structure 10, the closed cross-sections of the rockers 20 and the center skeleton portion 22 are formed by the joining at the vertically-overlapped joined portions Jv of the upper panel 28 and the lower panel 30 as described above, and therefore, deformation of the underbody 12 with respect to load at the time of a front collision is suppressed. To further explain this point, when the automobile V experiences a front collision as shown in FIG. 5, a bending moment Mv in the up-down direction arises at the rockers 20 and the center skeleton portion 22 due to a difference ΔH in the height at which the rockers 20 and the center skeleton portion 22 are provided, and the height of the collision position. In a comparative example in which a left/right-overlapped joined portion Jh (not shown) is disposed at the upper side that is the compression side with respect to vertical bending due to this bending moment Mv, there is the concern that the peeling-apart (opening) of the joined portion will arise. Namely, in the configuration of this comparative example, it is easy for peeling-apart of this left/right-overlapped joined portion to occur structurally due to the buckling of the left/right-overlapped flange. The peeling-apart of this joined portion is a cause of deterioration in the bending yield strength due to the collapsing (opening) of the closed cross-section, and therefore, reinforcement of the skeleton itself or the joined portion is needed.

In contrast, in the vehicle body structure 10, the rockers 20 and the center skeleton portion 22 are configured by the upper panel 28 and the lower panel 30 that are joined by the vertically-overlapped joined portions Jv as described above, and therefore, deform as shown in FIG. 6 due to the bending moment Mv. Namely, because the vertically-overlapped joined portion Jv is bent in the plate-thickness direction due to the bending moment Mv, it is difficult for the joined portion Jv to peel-apart with respect to vertical bending. Due thereto, collapsing of the cross-sections of the rockers 20 and the center skeleton portion 22, that is due to peeling-apart of the joined portion Jv, is prevented or markedly suppressed, and the reinforcement that is needed in the above-described comparative example can be rendered unnecessary.

Further, in the vehicle body structure 10 of the above-described configuration, the seat rails 66 are fixed to the rockers 20 and the center skeleton portion 22. Therefore, the rockers 20 and the center skeleton portion 22, that are skeleton members that are long in the front-rear direction, are reinforced (the rigidity thereof is enhanced), by the fixed seat rails 66, with respect to bending in the up-down direction and the vehicle width direction (the moment of inertia of area increases). Therefore, together with the upper panel 28 and the lower panel 30 being joined by the vertically-overlapped joined portions Jv, deformation of the underbody 12 with respect to load at the time of a front collision is suppressed.

Moreover, in the vehicle body structure 10, the collar nuts 68, that are for fastening and fixing the seat rails 66 to the rockers 20 and the center skeleton portion 22, connect the rocker top walls 38, the center top wall 40, and the bottom wall 32 that configure the facing walls of the closed cross-sections of the rockers 20 and the center skeleton portion 22. For this reason as well, the rockers 20 and the center skeleton portion 22 are reinforced with respect to vertical bending. Therefore, at the vehicle body structure 10, the cross-sectional shapes of the rockers 20 and the center skeleton portion 22 deforming with respect to bending in the up-down direction is suppressed. Namely, in addition to the above-described reinforcing effect due to the mounting of the seat rails 66 (the increase in the moment of inertia of area), reinforcement, with respect to bending, due to the maintaining of the cross-sections (the preventing of deformation of the cross-sectional shapes) of the rockers 20 and the center skeleton portion 22 by the collar nuts 68 is achieved.

Still further, in the vehicle body structure 10, because the seat rails 66 are fixed to the rockers 20 and the center skeleton portion 22, there is no need to separately provide brackets or the like for fixing the seat rails 66, and the number of parts is few and the structure is simple. In other words, in the vehicle body structure 10, by adopting the configuration in which the seat rails 66 are directly fixed to the rockers 20 and the center skeleton portion 22, these seat rails 66 are used for reinforcement of the rockers 20 and the center skeleton portion 22. Further, in the vehicle body structure 10, because the rockers 20 and the center skeleton portion 22 are formed by the vertically-overlapped joined portions Jv as described above, a configuration in which the rockers 20 and the center skeleton portion 22 are made integral with the floor 14 is realized. Namely, the general portion of the floor 14 (the portion other than the rockers 20 and the center skeleton portion 22), and the rockers 20 and the center skeleton portion 22, can be formed integrally by the joining of the upper panel 28 and the lower panel 30, which contributes to a further reduction in the number of parts.

Second Embodiment

A vehicle body structure 100 relating to a second embodiment of the present invention is described next on the basis of FIG. 7 and FIG. 8. Note that parts/portions that are basically the same as the first embodiment are denoted by the same reference numerals as in the first embodiment, and further, there are cases in which description and illustration are omitted.

Figure 7:
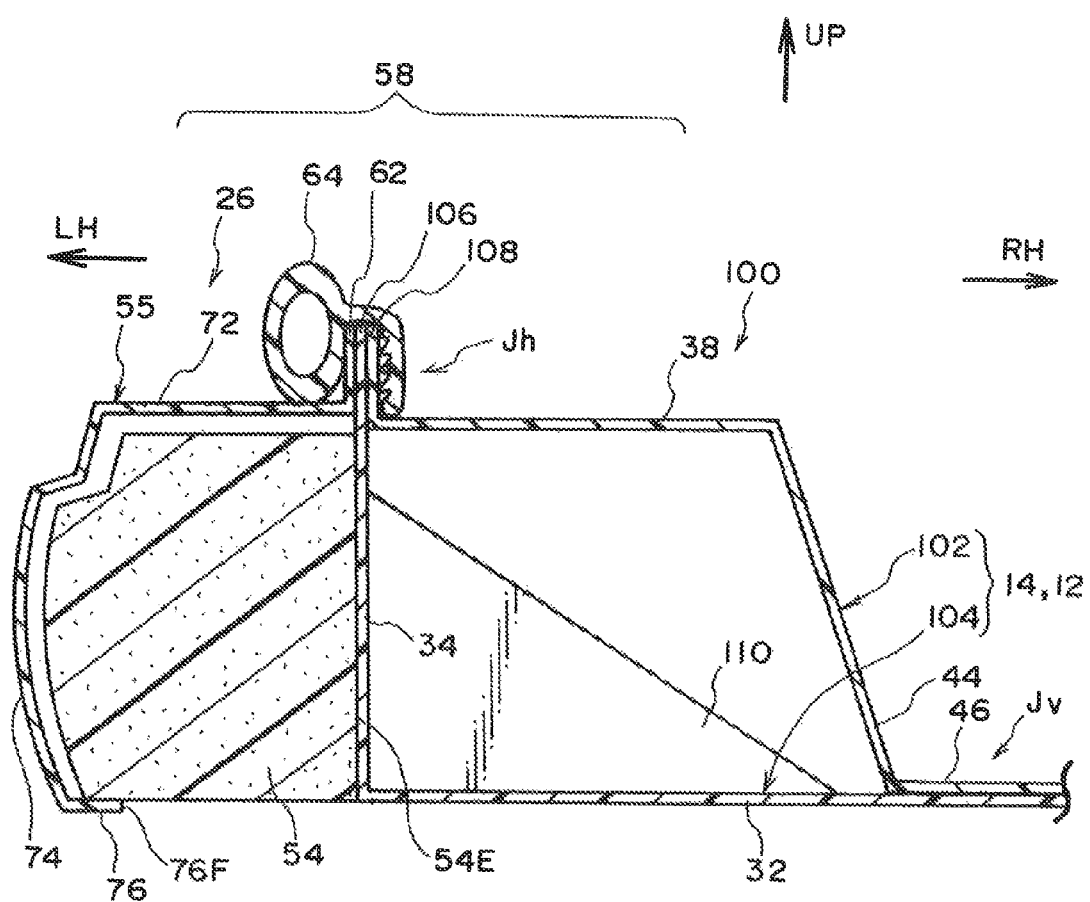
FIG. 7 is a cross-sectional view that corresponds to FIG. 1 and illustrates a vehicle body structure relating to a second embodiment of the present invention.

Main portions of the vehicle body structure 100 relating to the second embodiment are shown in FIG. 7 in a cross-sectional view corresponding to FIG. 1. As shown in this drawing, the vehicle body structure 100 differs from the first embodiment with regard to the point that an upper panel 102 and a lower panel 104, that form the main portions of the underbody 12, are provided instead of the upper panel 28 and the lower panel 30.

The lower panel 104 has a standing flange 106, that serves as the first flange, instead of the outer flange 36 and the standing flange 60. On the other hand, the upper panel 102 has a standing flange 108 that is left/right overlapped with and joined to the standing flange 106. The standing flange 106 extends so as to be directed upwardly from the upper end of the outer side wall 34 that forms the closed cross-section of the rocker 20. In this embodiment, the outer side wall 34 and the standing flange 106 are flush substantially along the up-down direction, and configure the vehicle width direction outer end portion of the rocker 20.

Further, the standing flange 62 that serves as the second flange at the outer panel 55 is further joined to a left/right-overlapped joined portion Jh of the standing flange 106 and the standing flange 108, and the opening flange 80 is formed. Accordingly, this embodiment is a configuration in which the opening flange 80 is disposed within the range of the closed cross-section of the rocker 20 (without projecting-out to the vehicle width direction outer side of the rocker 20).

Figure 8:
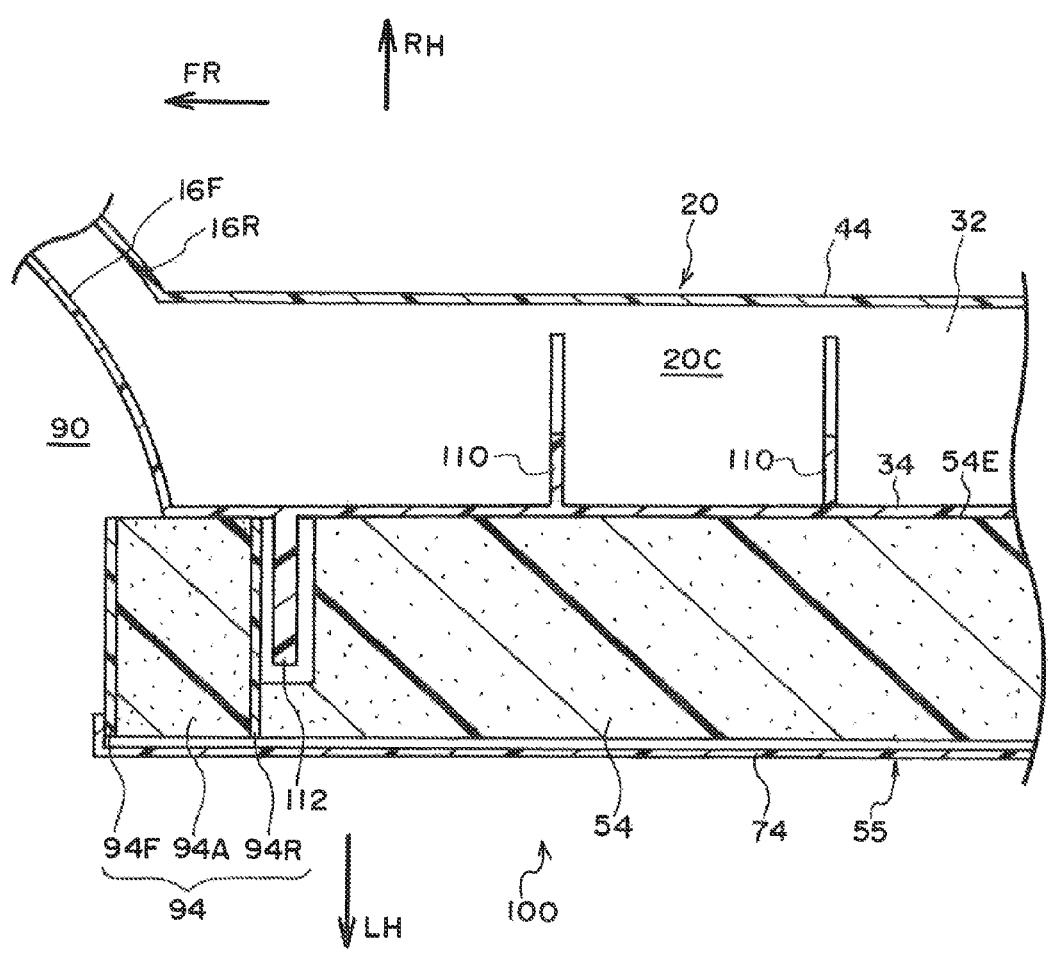
FIG. 8 is a plan sectional view showing the vehicle body structure relating to the second embodiment of the present invention.

Further, as shown in FIG. 8, the vehicle body structure 100 has, instead of the reinforcing ribs 82 that are disposed at the vehicle width direction outer side of the outer side wall 34, plural reinforcing ribs 110 that serve as the plural ribs and that are disposed at the vehicle width direction inner side of the outer side wall 34 with intervals therebetween in the front-rear direction. In this embodiment, the respective reinforcing ribs 110 are made integral with the bottom wall 32 and the outer side wall 34, and are formed in substantially right triangular shapes as seen in rear view.

Moreover, the vehicle body structure 100 has a rib 112 for a front collision that serves as the other rib. The rib 112 for a front collision is disposed at the vehicle width direction outer side with respect to the outer side wall 34. Namely, the vehicle width direction outer end of the rib 112 for a front collision is disposed further toward the vehicle width direction outer side than the vehicle width direction outer ends of the respective reinforcing ribs 110. In the same way as the rib 86 for a front collision, the rib 112 for a front collision is a configuration that supports the load of the EA member 94 for a front collision that is disposed between the rib 112 for a front collision and the front wheel 92, and that transmits the load to the rocker 20.

Because the vehicle body structure 100 is a configuration in which the reinforcing ribs 110 are disposed within the closed cross-section of the rocker 20, it is a configuration that does not have the slits 84 for the reinforcing ribs 110 at the EA member 54 for a side collision. The other configurations at the vehicle body structure 100, including portions that are not illustrated, are basically the same as the corresponding configurations of the vehicle body structure 10.

Accordingly, in accordance with the vehicle body structure 100 relating to the second embodiment as well, similar effects due to operation that is basically similar to the vehicle body structure 10 can be obtained, except for the operation and effects that are due to the rockers 20 and the underbody 12 being formed by the vertical overlapping of the upper panel 28 and the lower panel 30.

Further, in the vehicle body structure 100, because the reinforcing ribs 110 are disposed within the closed cross-section of the rocker 20, the pitch of the reinforcing ribs 110 can be determined independently of the energy absorbing performance of the EA member 54 for a side collision.

Accordingly, in the vehicle body structure 100, the degrees of freedom in setting the size and pitch of the reinforcing ribs 110 are high.

(Modified Example of EA Member)

Figure 9:
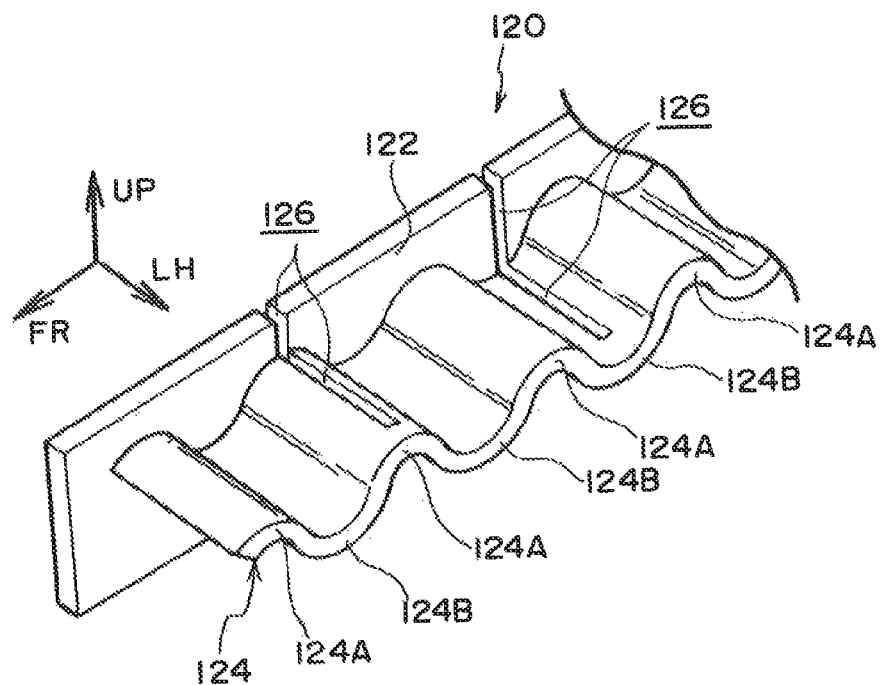
FIG. 9 is a perspective view showing a modified example of an EA member for a side collision that configures the vehicle body structures relating to the embodiments of the present invention.

In the above-described respective embodiments, examples are given of providing the EA member 54 for a side collision that is configured from foamed urethane foam or the like, but the present invention is not limited to this. For example, the present invention may be a configuration having an EA member 120 for a side collision that serves as an energy absorbing member and relates to a modified example as shown in FIG. 9.

The EA member 120 for a side collision is configured with a side plate 122, that is joined to the outer side wall 34, and an EA portion 124, that is wave-shaped, as the main portions. The side plate 122 is formed in the shape of a flat plate that is long in the front-rear direction and whose thickness direction is the vehicle width direction. The EA portion 124 is formed in a wave shape as seen in side view in which mountain portions 124A and valley portions 124B are alternately connected in the front-rear (longitudinal) direction. The mountain portions 124A and the valley portions 124B are respectively formed in substantially semicircular arc shapes as seen in side view.

At the EA member 120 for a side collision, both the EA portion 124 and the side plate 122 are configured by CFRP. This EA member 120 for a side collision is a configuration that, when side collision load is inputted from the vehicle width direction outer side (the side opposite the side plate 122 side), absorbs collision energy of the side collision while being deformed (brittlely fractured). Slits 126, into which the reinforcing ribs 82 and the rib 86, 112 for a front collision are inserted, are formed as needed in the EA member 120 for a side collision.

Figure 10:
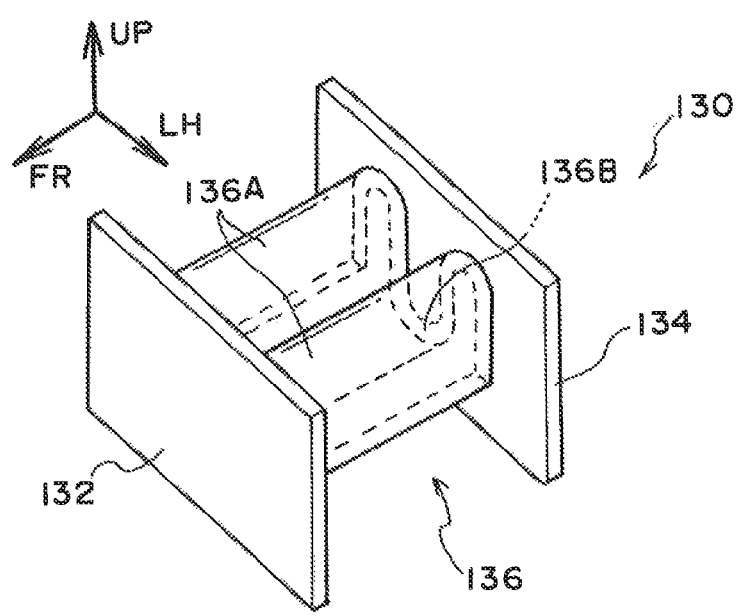
FIG. 10 is a perspective view showing a modified example of an EA member for a front collision that configures the vehicle body structures relating to the embodiments of the present invention.

Further, in the above-described respective embodiments, examples are given of providing the EA member 94 for a front collision in which the EA portion 94A is formed from a foamed urethane foam or the like, but the present invention is not limited to this. For example, the present invention may be a configuration having an EA member 130 for a front collision that serves as another energy absorbing member and relates to a modified example as shown in FIG. 10.

The EA member 130 for a front collision is configured as if an EA portion 136 is nipped between a load input wall 132 and a load transmitting wall 134. The EA portion 136 is formed in a wave shape as seen in front view in which mountain portions 136A and valley portions 136B are alternately connected in the vehicle width direction. The mountain portions 136A and the valley portions 136B are respectively formed in substantially semicircular arc shapes as seen in front view.

At the EA member 130 for a front collision, the load input wall 132, the load transmitting wall 134 and the EA portion 136 are all configured by CFRP. This EA member 130 is a configuration that, when front collision load is inputted to the load input wall 132, absorbs collision energy of the front collision while being deformed (brittlely fractured).

Note that, in the above-described respective embodiments, examples are given in which the seat rails 66 are fixed to the rockers 20 and the center skeleton portion 22. However, the present invention is not limited to this. For example, the present invention may be a configuration in which the vehicle width direction inner and outer seat rails 66 are fixed to the underbody 12 via brackets 12 or the like. Further, for example, the present invention may be a configuration in which the seat rails 66 at the vehicle width direction outer sides are fixed to the rockers 20, and the seat rails 66 at the vehicle width direction inner side are fixed to the floor 14 via brackets or the like. Moreover, for example, the present invention may be a configuration in which the seat rails at the vehicle width direction inner side are fixed to the center skeleton portion 22, and the seat rails 66 at the vehicle width direction outer sides are fixed to the floor 14 via brackets or the like.

Further, in the above-described respective embodiments, examples are given in which the upper panel 28, 102 and the lower panel 30, 104 are configured by CFRP, but the present invention is not limited to this. For example, the upper panel 28, 102 and the lower panel 30, 104 may be configured by metal members such as steel plates or the like.

Moreover, in the above-described respective embodiments, examples are given in which the reinforcing ribs 82, 110 and the rib 86, 112 for a front collision are provided at the rocker 20, but the present invention is not limited to this. For example, the present invention may be a configuration that does not have some or all of the reinforcing ribs 82, 110 and the rib 86, 112 for a front collision. Further, it goes without saying that the present invention can be either of a configuration that is provided with the above-described EA members for a rear collision and ribs for a rear collision, or a configuration that is not provided with EA members for a rear collision and ribs for a rear collision.

In addition, it goes without saying that the present invention can be implemented by being modified appropriately within a range that does not deviate from the gist thereof.

The invention claimed is:

1. A vehicle body structure comprising:
   a skeleton member that is long in a vehicle front-rear direction and has a closed cross-sectional portion wherein a cross-section orthogonal to the longitudinal direction is a closed cross-section, due to joining of an upper panel and a lower panel, and having a first flange that is disposed so as to prescribe a lower edge of an opening for ingress/egress at a vehicle width direction outer end side of a vehicle body and that is provided at a vehicle width direction outer end of the closed cross-sectional portion or at a vehicle width direction outer side with respect to the closed cross-sectional portion so as to face the vehicle width direction outer side;
   an outer panel having a second flange that is joined to the first flange and as seen from the longitudinal direction of the skeleton member, an end portion thereof at a side opposite to the second flange provided as a free end, and that configures an opening flange that projects out into the opening for ingress/egress, and covering the skeleton member from the vehicle width direction outer side; and
   an energy absorbing member disposed between the outer panel and an outer side wall that configures a vehicle width direction outer side at the closed cross-sectional portion of the skeleton member.

2. The vehicle body structure of claim 1, wherein:
   the energy absorbing member is fixed to the outer side wall that configures the closed cross-sectional portion of the skeleton member; and
   a plurality of ribs are formed at the outer side wall at intervals in the vehicle front-rear direction.

3. The vehicle body structure of claim 2, wherein:
   the upper panel and the lower panel are joined at a vertically-overlapped joined portion that is disposed between the closed cross-sectional portion and the first flange in a vehicle width direction; and
   the ribs project out toward the vehicle width direction outer side from the outer side wall configured by the lower panel, and positions in the vehicle width direction of projecting-out ends of the ribs are positioned within a range of a thickness of the opening flange in the vehicle width direction.

4. The vehicle body structure of claim 3, wherein the ribs are formed integrally respectively with the outer side wall and a portion, at the lower panel side, of the vertically-overlapped joined portion.

5. The vehicle body structure of claim 3, wherein:
   the upper panel and the lower panel are joined at a vertically-overlapped joined portion that is disposed at an inner side in the vehicle width direction with respect to the closed cross-sectional portion; and
   at least one of the upper panel or the lower panel extends in the vehicle width direction and configures at least a portion of a vehicle floor.

6. The vehicle body structure of claim 2, wherein:
   a position, in a vehicle width direction, of the outer side wall coincides with the first flange; and
   the ribs project out toward an inner side in the vehicle width direction with respect to the outer side wall.

7. The vehicle body structure of claim 2, further comprising:
   another rib that projects out toward a vehicle width direction exterior from the outer side wall at a front side or a rear side, in the vehicle front-rear direction, with respect to the plurality of ribs, and whose dimension in the vehicle width direction is larger than the ribs or at which a position of a vehicle width direction outer end is positioned further toward the vehicle width direction outer side than the ribs; and
   another energy absorbing member that is disposed between the other rib and a wheel in the vehicle front-rear direction, and that absorbs impact energy in the vehicle front-rear direction.

* * * * *